May 20, 1952 A. ALFORD ET AL 2,597,607
APPARATUS FOR MEASURING DISTANCE
Filed Feb. 7, 1946 2 SHEETS—SHEET 1

INVENTORS
ANDREW ALFORD
BY HAROLD M. HART

THEIR ATTORNEY

May 20, 1952     A. ALFORD ET AL     2,597,607
APPARATUS FOR MEASURING DISTANCE
Filed Feb. 7, 1946     2 SHEETS—SHEET 2

*INVENTORS*
ANDREW ALFORD
HAROLD M. HART
BY
THEIR ATTORNEY

Patented May 20, 1952

2,597,607

UNITED STATES PATENT OFFICE 2,597,607

APPARATUS FOR MEASURING DISTANCE

Andrew Alford, Cambridge, and Harold M. Hart, Wellesley, Mass., assignors, by mesne assignments, to Raytheon Manufacturing Company, a corporation of Delaware Application February 7, 1946, Serial No. 646,098

14 Claims. (Cl. 343—13)

The present invention relates to radar systems, that is, systems for radio echo distance measurement. More particularly the present invention relates to radar systems employing a pulse of high frequency electromagnetic energy whose time of travel to and from a reflecting object is measured.

Radar systems as so far developed have been subject to a minimum measurable range of a considerable order of magnitude, much greater than any limitation imposed by the wave lengths of the electromagnetic waves making up the projected pulse. One of the reasons for this minimum range limitation is due to the time length of the signal pulse, since some energy from the transmitter gets into the receiver-indicator equipment, so that the latter is unable to produce an indication of a reflected pulse until the original transmitted pulse has ceased. Further than this, the receiving amplifier, unless elaborate precautions are taken, is unable to distinguish between two pulses unless there is a considerable time interval between them. The necessary time interval is frequently referred to as the receiver recovery time. While it may be possible to avoid these difficulties, such possibilities involve complicated expensive arrangements which, therefore, are not practical. It is an object of the present invention to provide a radar system, having a substantially zero minimum range.

Figure 1:
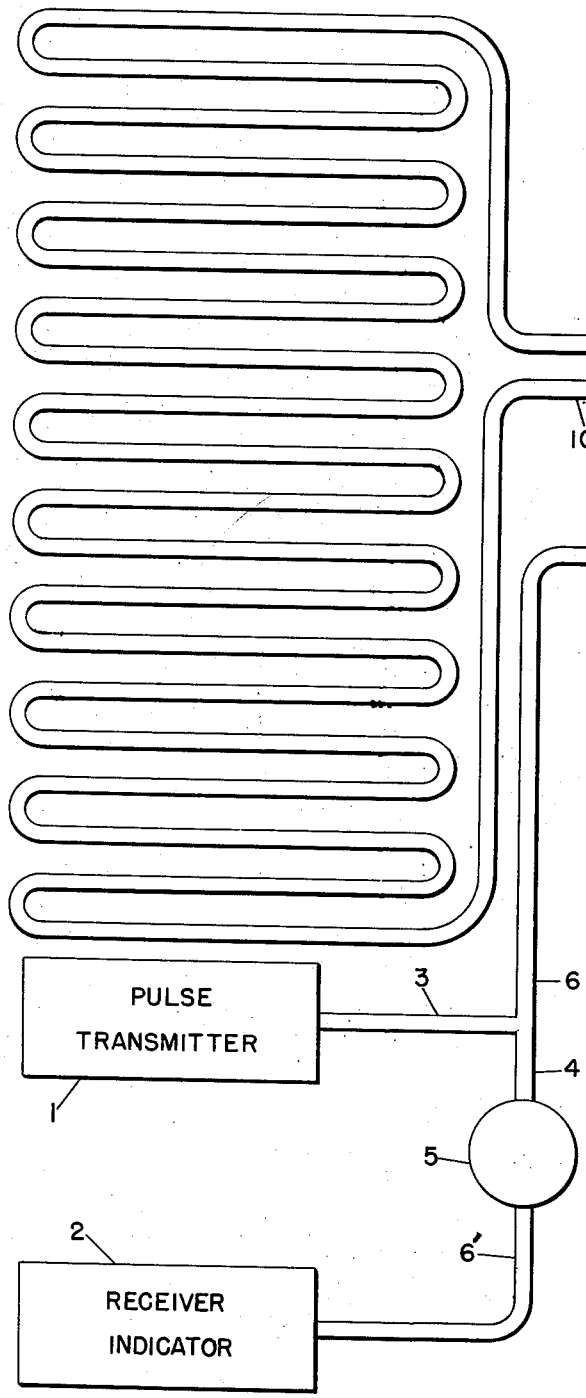
Figure 2:
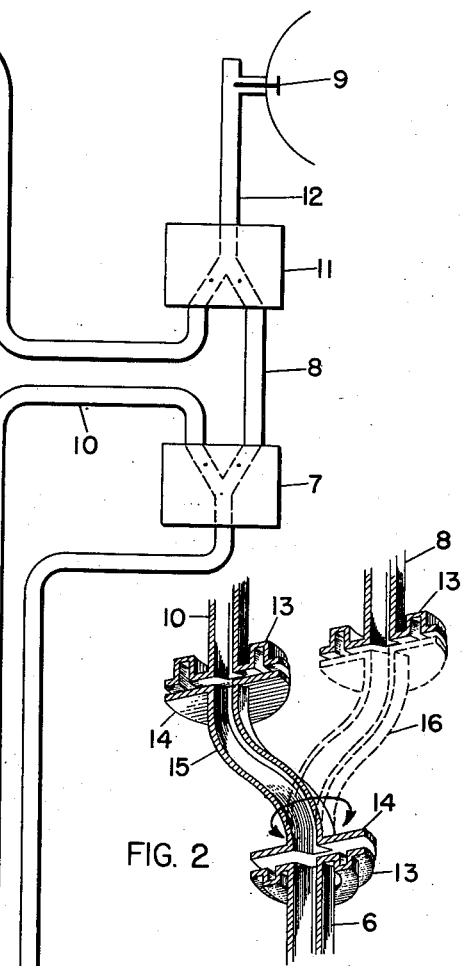
Figure 3:
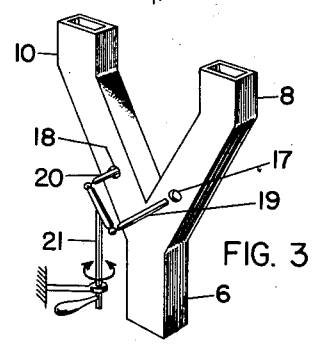
Figure 4:
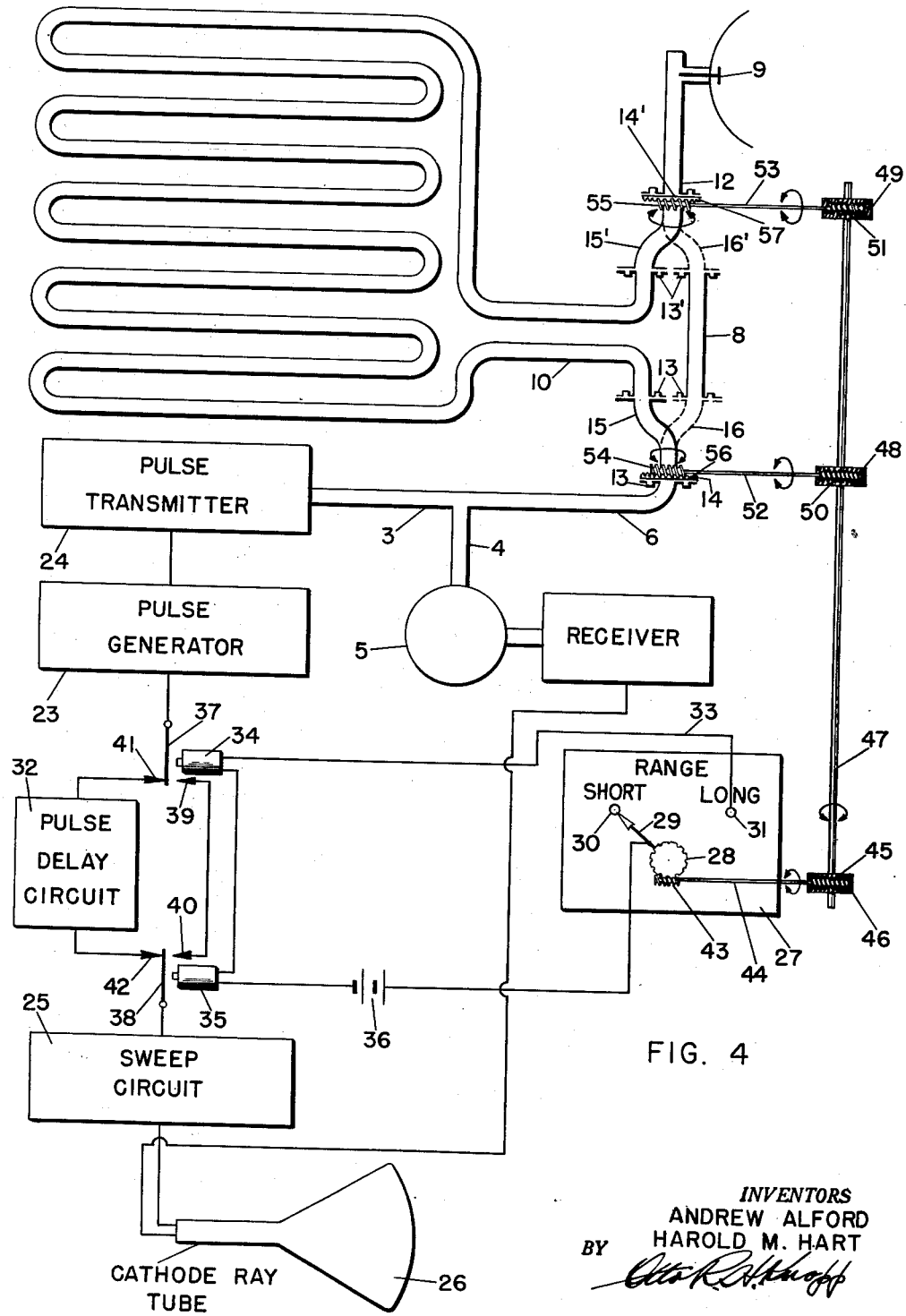

This and other objects of the present invention, as well as its construction and operation will appear and be understood from the following description taken in connection with the accompanying drawings, in which Fig. 1 presents a schematic diagram of the invention; Fig. 2 shows schematically in section a form of wave guide switching device; Fig. 3 shows schematically a modified form of wave guide switching device; and Fig. 4 shows schematically a complete system with combined range selector switch and indicator correction circuit arrangement.

As indicated above, commercially feasible pulsing radar systems have, up to the present time, been subject to considerable minimum range limitations. According to our invention we remove this limitation effectively, though not actually, by removing the pulse transmitter and receiver-indicator apparatus away from the transmitting-receiving antenna by a distance substantially equal to the minimum range limitation. We accomplish this by introducing a time delay line between the transmitter-receiver and the antenna. Such a time delay line may take any suitable form. However, when the frequencies being used are sufficiently high we prefer to use a wave guide having the necessary time length.

Inasmuch as such a wave guide, and for that matter practically every other type of delay line of sufficient time length, introduces considerable attenuation into the system, the maximum range may thereby be reduced an undesirable amount. In such cases we further provide a means for disconnecting the delay line from the system so that the usual direct connection between the transmitter-receiver and the antenna can be used for the greater distances. We also provide means for making the necessary correction in the indicator.

Referring now to the drawings, a pulse transmitter is shown at 1, and a receiver-indicator at 2. These may be connected together in any desired manner, it being assumed only that some energy from the transmitter affects the receiver. However, a direct connection is shown involving wave guide sections 3 and 4, a transmit-receive tube 5 and wave guide section 6' connecting the transmit-receive tube to the receiver-indicator. At the junction of the wave guide sections 3 and 4, a further section 6 is connected to a switching device and impedance matching unit 7, whose output may be conducted through wave guide 8 through switching device and impedance matching unit 11 to the antenna 9 or alternatively to the antenna through a delay wave guide 10. This, as indicated in the drawings, may be a long wave guide.

In the operation of the system, assuming the switches 7 and 11 are arranged to include the delay wave guide, a pulse produced by the pulse transmitter 1 travels through the wave guide 3 at the end of which a part of the energy travels by way of wave guide 4, transmit-receive tube 5 and wave guide 6 to the receiver-indicator 2. The remainder of the pulse energy travels through wave guide 6 and the switch 7 to the delay wave guide 10, switch 11 and wave guide 12 to the antenna 9 where it is radiated into space. A reflected impulse received by the antenna 9 travels in the reverse direction, through switch 11, the wave guide 10, switch 7, wave guide sections 6 and 4, transmit-receive tube 5 and wave guide 6 to the receiver-indicator 2.

It may be noted here that, as heretofore used in the art, the wave guide sections 3 and 4 and the transmit-receive tube 5 are arranged to present a high impedance to the high powered transmitted pulse from the transmitter 1 to keep most of the power from the latter out of the receiver, whereas the path from the antenna 9 through the transmit-receive tube 5 to the receiver-indicator 2 presents a path of low impedance to signals of low energy.

It will be observed that, with the delay wave guide in circuit, the pulse from the transmitter 1 reaches the receiver-indicator nearly instantaneously, but reaches the antenna 9 only after traversing the time delay path 10. Similarly, a reflected pulse picked up by the antenna 9 reaches the receiver-indicator only after the time delay represented by the path 10. By this means, the transmitted pulse will have had time to pass completely through the receiver-indicator and the latter will have had time to recover after the passage of the transmitted pulse before the reflected pulse appears at the receiver-indicator. Therefore, even though the reflecting object may be at zero distance from the antenna 9, the receiver-indicator 2 will be in condition to indicate the arrival of the reflected pulse by the time it reaches the receiver-indicator.

The indicating device itself, which is contained in the indicator and which may be any suitable device, for example a cathode ray tube, can be properly calibrated to provide for the subtraction from the indicated distance of the reflecting object of the distance represented by the time required for the transmitted and reflected pulses to travel through the delay wave guide 10. The time length of the delay wave guide, as has been mentioned, should be sufficient to enable the receiver-indicator to recover completely from the transmitted pulse before a pulse reflected from an object at zero distance from the antenna 9 reaches the receiver-indicator. The delay time of the wave guide 10 must therefore be greater than the time length of the pulse produced by the transmitter. It is preferable to have the wave guide produce a minimum total delay time equal to the pulse length plus the recovery time of the receiver-indicator. It will be observed, however, that, since both the transmitted and reflected impulses must pass through the wave guide 10, a wave guide having a delay time of only one half of the sum of the pulse length and the receiver-indicator recovery time is required. It should also be noted that delay wave guide length may be reduced by the equivalent of the lengths of the wave guide section 12 between switch 11 and the antenna, and of section 6 between switch 7 and the junction with guides 3 and 4.

As an example, let us assume that the transmitter produces a one half microsecond pulse and that the receiver-indicator recovery time is one quarter microsecond. This means that the receiver-indicator will not be able to indicate the receipt of a reflected pulse until 3/4 microsecond after the beginning of the transmitted pulse. The minimum range of such a system without our invention would then be approximately 112.5 meters. If however, a delay wave guide, such as 10, having a time delay of three eighths of a microsecond, be inserted between the antenna and transmitter-receiver, a reflected signal can be indicated even though the reflecting object is at zero distance from the antenna 9. If a wave guide be used to provide the delay path, approximately 56 meters of wave guide should be sufficient to provide slightly more than three quarters microsecond total time delay due to the lower velocity of electromagnetic waves in wave guides. This length of wave guide may be mounted in any desired manner. It may, for example, be coiled into a spiral or folded upon itself, as shown, in order to conserve space.

The loss of energy resulting from two-way travel through such a wave guide may be expected with present techniques to be of the order of 40 decibels, which would reduce the maximum range of the system by a factor of three and one half. This may or may not be a serious matter depending upon the use to which the system is to be put. However, if both short and long ranges are desired, a suitable switching device may be used to disconnect or render ineffective the delay wave guide 10 and to provide for the transmission and reception of pulses for long distance ranging by means of a direct connection to the antenna 9, as by the wave guide section 8 shown in the drawings.

This involves suitable switching devicees 7 and 11. Examples of such switching devices for wave guides are shown in Figs. 2 and 3, although other suitable arrangements may be used. In Fig. 2 the wave guide sections 6, 8 and 10 are terminated in choke flanges 13. Between them is a bent section of wave guide 15, terminated in coupling plates 14. The wave guide section 15 is mounted so that it can be rotated to make connection between wave guide section 6 and either section 10 or 8 as desired. As shown in the drawing, section 15 is in position to connect section 6 to section 10. Its opposite position is indicated dotted at 16.

An alternative wave guide switching arrangement is shown in Fig. 3. Here the wave guide section 6 divides into two branches, one providing a direct path to wave guide section 10 and the other to wave guide section 8. Holes 17 and 18 may be drilled in the two branches of the wave guide. Rods 19 or 20 inserted in the holes will then have the effect of presenting a high impedance to the passage of high frequency waves into the respective branch path. These rods may be arranged on a lever mechanism which can be rotated by handle 21 to insert rod 19 in hole 17 or rod 20 in hole 18 depending upon whether path 10 or path 8 is to be selected.

It will be evident that when a delay wave guide is used the zero range calibration point on the indicator will be different than when the delay wave guide is not used. We therefore provide an arrangement for correcting the range indication. Such correction means is preferably arranged so that it will be operated simultaneously with the operation of the wave guide switching device and preferably so that both indicator correction and wave guide switching can be controlled by the operator from a single point such as by the actuation of a range selector switch. A complete system of this kind is shown schematically in Fig. 4. In this figure similar parts are given the same reference numerals as in other figures. It will be noted, however, that the pulse generator has been separated from the pulse transmitter and that the cathode ray tube indicator and sweep circuit have been separated from the receiver, whereas these elements were combined in Fig. 1.

Referring now specifically to Fig. 4, there is provided a pulse generator 23 which initiates high frequency pulses at the desired rate of transmission. The pulse generator actuates the pulse transmitter 24 which produces the high frequency electromagnetic wave energy, which is conducted by wave guide sections 3 and 6 eventually to transmitting antenna 9. The pulse generator 23 also initiates the action of a sweep circuit 25 which controls the position of the electron beam in a cathode ray tube indicator 26. The pulse generator may operate directly upon the sweep circuit or through a pulse delay circuit 32 depending upon whether long range or short range has been selected.

The pulse delay circuit 32 may be any suitable device for producing a time delay in the travel of pulses produced by the pulse generator 23 to the sweep circuit 25 whereby the initiation of the sweep voltage, which controls the position of the cathode beam in the indicator 26, will be delayed by a time approximately equal to the time delay introduced into the antenna circuit by the delay wave guide 10.

A range selector switch 27 is provided, which has an operating knob 28 carrying a contact-making arm 29 adapted to contact stud 30 for short range and stud 31 for long range. The contact stud 31 is connected by lead 33 to relay coil 34, relay coil 35 and battery 36, all in series. The circuit is completed through the arm 29 when it makes contact with the stud 31. Thus, when long range is selected, relays 34 and 35 are energized, so that relay arms 37 and 38 connect with stationary contacts 39 and 40, respectively. There is thus provided a direct connection between the pulse generator 23 and the sweep circuit 25, the pulse delay circuit 32 being disconnected. However, when the arm 29 of the range switch 27 is at the stud 30, as shown in the drawings, the relay circuit is deenergized leaving the relay arms 37 and 38 making connection with relay contacts 41 and 42, respectively. The pulse generator 23 is then connected to the sweep circuit 35 through the pulse delay circuit 32.

The range switch 27 may have its operating knob 28 also arranged to operate the wave guide switching mechanism. A suitable arrangement is schematically shown in the drawing, although other arrangements may of course be used. As shown, the knob 28 is provided with a gear meshing with another gear 43 which is fixed to a shaft 44. At the opposite end of the latter there is mounted a gear 45 which meshes with gear 46 mounted on shaft 47. The latter carries two other gears 48 and 49 which, meshing with gears 50 and 51, serve to rotate the shafts 52 and 53, respectively. Shafts 52 and 53 terminate in gears 54 and 55 which mesh with crown gears 56 and 57 mounted on the plates 14 and 14' of movable wave guide switching sections 15 and 15'. These wave guide switching sections may be arranged in the manner shown in detail in Fig. 2. As shown in the drawing, the switching sections 15 and 15' are in position to connect wave guide section 6 to the antenna 9 through delay wave guide 10. In their other positions (shown dotted at 16 and 16') the wave guide section 6 is connected to the antenna 9 directly through a short wave guide section 8.

We have therefore provided a switching system with a unitary control for changing from short range to long range measurement, and vice versa. Thus, if the operator selects the short range position of switch 27, the delay wave guide 10 is included in the antenna circuit and at the same time indicator compensation is provided by interposing the pulse delay circuit 32 between the pulse generator 23 and the sweep circuit 25. On the other hand, if the operator selects the long range setting of switch 27, the delay wave guide 10 is cut out of the antenna circuit and, simultaneously, the necessary indicator compensation is removed since the pulse delay circuit 32 is cut out from the indicator timing circuit.

While we have shown the use of wave guides, it will be understood that other suitable means of conveying the electromagnetic energy may be used. Thus, while we have indicated that the required delay time may be produced by means of a wave guide, the delay time can likewise be obtained for lower frequencies with a coaxial transmission line or an artificial line or other means. The term "delay line" as used in the claims includes any suitable means for producing the desired time delay.

Having now described our invention, we claim:

1. An echo distance measuring system comprising means for generating an electrical impulse, transducer means for producing a wave energy impulse in response to said electrical impulse and for producing an electrical impulse in response to a reflected wave impulse, receiving means responsive to electrical impulses, circuit means for connecting said generating means and said receiving means to said transducer means, said circuit means including time delay means for said electrical impulses, an indicator having a measuring scale and an indicating element which traverses the same at a controlled rate for measuring and indicating the time of travel from the transmission of said wave energy impulse to the receipt of the reflected wave energy, and means for starting a measuring traverse of said indicating element along said scale at a time after operation of said generating means corresponding to the effective time delay of said time delay means.

2. An echo distance measuring system comprising means for generating an electrical impulse, transducer means for producing a wave energy impulse in response to said electrical impulse and for producing an electrical impulse in response to a reflected wave impulse, receiving means responsive to electrical impulses, circuit means for connecting said generating means and said receiving means to said transducer means, said circuit means including time delay means for said electrical impulses having an effective time delay greater than the time length of said generated impulses, an indicator having a measuring scale and an indicating element which traverses the same at a controlled rate for measuring and indicating the time of travel from the transmission of said wave energy impulse to the receipt of the reflected wave energy, and means for starting a measuring traverse of said indicating element along said scale at a time after operation of said generating means corresponding to the effective time delay of said time delay means.

3. An echo distance measuring system comprising means for generating an electrical impulse, transducer means for producing a wave energy impulse in response to said electrical impulse and for producing an electrical impulse in response to a reflected wave impulse, receiving means responsive to electrical impulses, circuit means for connecting said generating means and said receiving means to said transducer means, said circuit means including time delay means having a total effective time delay substantially equal to said wave impulse time length plus the recovery time of said receiving means, an indicator having a measuring scale and an indicating element which traverses the same at a controlled rate for measuring and indicating the time of travel from the transmission of said wave energy impulse to the receipt of the reflected wave energy, and means for starting a measuring traverse of said indicating element along said scale at a time after operation of said generating means corresponding to the effective time delay of said time delay means.

4. An echo distance measuring system comprising means for generating an electrical impulse, transducer means for producing a wave energy impulse in response to said electrical impulse and for producing an electrical impulse in response to a reflected wave impulse, receiving means responsive to electrical impulses and circuit means for connecting said generating means and said receiving means to said tranducer means, said circuit means including time delay means for said electrical impulses and means for effectively by-passing said time delay means.

5. A radar system comprising a pulse transmitter, a pulse receiver, an antenna, circuit means for connecting said transmitter and said receiver to said antenna, a delay line and switch means for connecting said line or a substantially delay-less line section alternately into said circuit means in series therewith.

6. A radar system comprising a pulse transmitter, a pulse receiver, an antenna, transmission line means for connecting said transmitter and said receiver to said antenna, a wave guide connected in series with said transmission line means and having a time length sufficient to delay the arrival at the receiver of pulses starting from the antenna until the receiver has recovered from excitation by the transmitted pulse, an indicator having a measuring scale and an indicating element which traverses the same at a controlled rate for measuring and indicating the time of travel from the transmission of a transmitted wave energy impulse to the receipt of the reflected wave energy, and means for starting a measuring traverse of said indicating element along said scale at a time after operation of said transmitter corresponding to the effective time length of said wave guide.

7. An echo distance measuring system comprising a pulse generator, a transducer, a pulse receiver, said receiver being affected by generated pulses, pulse delay means between said receiver and said transducer having an effective pulse delay time greater than the generated pulse time length, a distance indicator having a measuring scale and an indicating element which traverses the same at a controlled rate, and means for delaying the start of a measuring traverse of said indicating element along said scale by a time after pulsing of said generator corresponding to said effective time delay.

8. A radar system comprising a pulse transmitter, a pulse receiver, an antenna, circuit means for connecting said transmitter and said receiver to said antenna, said means including a delay line, an indicator having a time-measuring scale and an indicator which cyclically traverses the same for indicating the time of receipt of reflected pulses and means for starting the time measuring cycle of said indicator at a time after operation of said transmitter corresponding to the time of travel of pulses through said delay line.

9. A radar system comprising a pulse transmitter, a pulse receiver, an antenna, circuit means for connecting said transmitter and said receiver to said antenna, said means including a delay line, a cathode ray tube indicator having a cathode beam, a sweep circuit for controlling the position of said cathode beam and means for delaying the operation of said sweep circuit by a time substantially equal to the effective time length of said delay line.

10. A radar system comprising a pulse generator, a pulse transmitter operated thereby, a pulse receiver, an antenna, means connecting said transmitter and receiver to said antenna, said means including a delay line, a cathode ray tube indicator connected to said receiver for indicating received pulses by means of a cathode beam, a sweep circuit for controlling the position of said cathode beam, means connecting said pulse generator to said sweep circuit for initiating the operation of the latter and a pulse delay circuit interposed between said pulse generator and said sweep circuit for retarding the operation of said sweep circuit, the effective time delay of said delay line and of said pulse delay circuit being the same and sufficiently long to permit the receiver to recover from the shock of the transmitted pulse in time to receive and cause an indication of echoes from the most proximate objects.

11. A radar system comprising a pulse transmitter, a pulse receiver, an antenna, circuit means for connecting said transmitter and said receiver to said antenna, a delay line, an indicator having time-of-travel measuring means, means for initiating a measuring cycle of said measuring means, time delay means for said initiating means having similar delay to said delay line, and selective switching means for simultaneously connecting said delay line into said circuit means and said time delay means to said initiating means and for simultaneously disconnecting said delay line from said circuit means and said time delay means from said initiating means.

12. In a radar system having a pulse transmitter, a pulse receiver, an antenna and circuit means for connecting said transmitter and said receiver to said antenna, the combination of a delay line, a substantially delay-less line section, and a range selector switch, said switch being adapted by operation thereof to connect and disconnect said delay line into and from said circuit means, and to substitute said delay-less line section for said delay line when the latter is so disconnected.

13. In a radar system having a pulse transmitter, a pulse receiver, an antenna, circuit means for connecting said transmitter and said receiver to said antenna, and an indicator, the combination of a delay line, a substantially delay-less line section, and a range selector switch, said switch being adapted by operation thereof to connect and disconnect said delay line into and from said circuit means, and to substitute said delay-less line section for said delay line when the latter is so disconnected, indicator starting means, time delay means and means adapted to be energized by operation of said range selector switch for connecting and disconnecting said time delay means to and from said indicator starting means.

14. In an echo distance measuring system employing a pulse generator, a pulse receiver, a distance indicator having a time base and an indicating element which is moved along said time base from an initial position to a terminal position, and energy converter means for radiating and receiving wave energy, minimum range setting means comprising means providing a time delay in at least a portion of the path of travel of the energy pulse within the system from the generator to the converter means and from the converter means to the receiver, and means providing a similar delay in the initiation of travel of said element along the time base of said indicator.

ANDREW ALFORD.
HAROLD M. HART.

REFERENCES CITED

The following references are of record in the file of this patent:

UNITED STATES PATENTS

| Number | Name | Date |
|---|---|---|
| 2,129,712 | Southworth | Sept. 13, 1938 |
| 2,396,044 | Fox | Mar. 5, 1946 |
| 2,407,198 | Wolff | Sept. 3, 1946 |
| 2,412,159 | Leeds | Dec. 3, 1946 |
| 2,416,895 | Bartelink | Mar. 4, 1947 |
| 2,418,143 | Stodola | Apr. 1, 1947 |
| 2,419,205 | Feldman | Apr. 22, 1947 |
| 2,422,204 | Meacham | June 17, 1947 |
| 2,426,501 | Hart | Aug. 26, 1947 |
| 2,426,989 | De Rosa | Sept. 9, 1947 |